June 14, 1955  H. E. ALTGELT  2,710,569
HITCH DEVICE FOR CONNECTING AN
IMPLEMENT TO A FARM TRACTOR
Filed Aug. 21, 1952  2 Sheets-Sheet 1

INVENTOR.
HERMAN E. ALTGELT
ATTORNEYS

June 14, 1955
H. E. ALTGELT
2,710,569
HITCH DEVICE FOR CONNECTING AN
IMPLEMENT TO A FARM TRACTOR
Filed Aug. 21, 1952
2 Sheets-Sheet 2
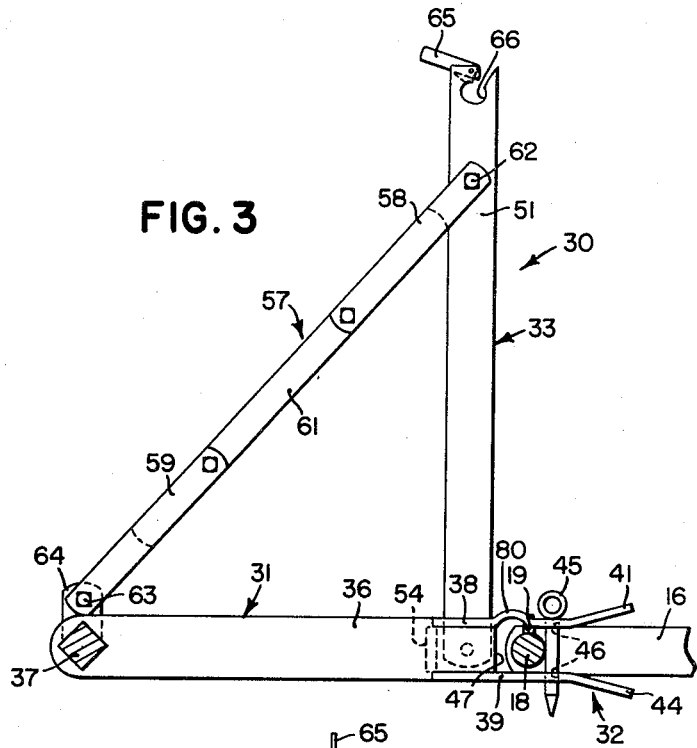
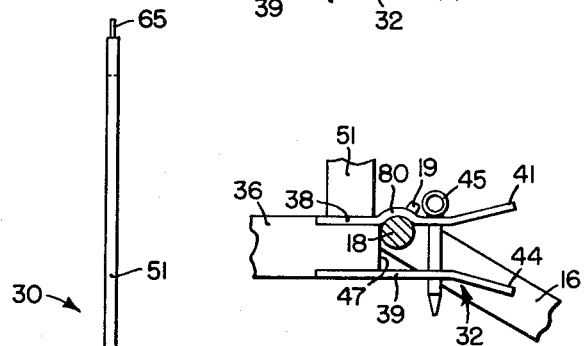
*INVENTOR.*
HERMAN E. ALTGELT
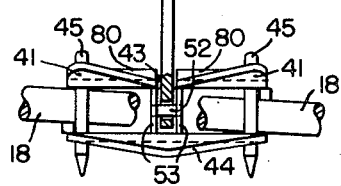
*ATTORNEYS*

United States Patent Office 2,710,569
Patented June 14, 1955

2,710,569

HITCH DEVICE FOR CONNECTING AN IMPLEMENT TO A FARM TRACTOR

Herman E. Altgelt, Moline, Ill., assignor to Deere & Company, Moline, Ill., a corporation of Illinois Application August 21, 1952, Serial No. 305,677

7 Claims. (Cl. 97—47.14)

The present invention relates generally to agricultural implements and more particularly to hitch devices for connecting an implement or the like to a farm tractor.

The object and general nature of the present invention is the provision of a new and improved hitch device wherein the implement, while connected with the tractor so as to be controlled, raised and lowered from the tractor, is capable of swinging and/or tilting laterally relative to the tractor without imposing undesirable forces on either the tractor or the implement, or both.

Another feature of this invention is the provision of a hitch device for connecting an implement with the tractor, said hitch device being of the type in which the propelling force is transmitted from the tractor to the implement through lower link means and any overturning tendency of the implement is resisted by means of an upper link member connected between the implement and the tractor, the upper link member, according to the principles of the present invention, being laterally rigid with respect to the tractor, although capable of generally vertical swinging, and the rear portion of the upper link member being connected with the hitch device through means which permits the implement to tilt laterally, as about a generally fore-and-aft extending axis, relative to the tractor. The advantage of this arrangement is that when the implement tilts laterally, the lateral tilting movement of the implement does not carry the connection between the implement and the rear portion of the upper link member to one side of the generally longitudinal axis of the tractor. As a result of this arrangement there are no appreciable laterally directed components of force acting between the upper portion of the implement, and/or the hitch device, and the tractor, to cause the implement to be held out of the proper position with respect to the tractor.

A further feature of this invention is the provision of means operable when the implement is lifted into a transport position to prevent the implement from swinging laterally relative to the tractor, and a further feature is the provision of means of this character which, if the implement should strike an obstruction, is permitted to swing laterally to pass by said obstruction.

These and other objects and advantages of the present invention will be apparent to those skilled in the art after a consideration of the following description, taken in conjunction with the accompanying drawings, in which:

Figure 3 is a side view, taken generally along the line 3—3 of Figure 2.

Figure 4 is a fragmentary view taken from the front of the hitch device, generally along the line 4—4 of Figure 2, showing the implement and hitch device in a laterally tilted position with respect to the tractor.

Figure 5 is a view similar to Figure 3 but with the implement and associated parts in a raised position, Figure 5 particularly illustrating the means that yieldably holds the implement against lateral swinging when in its transport position.

Figure 1:
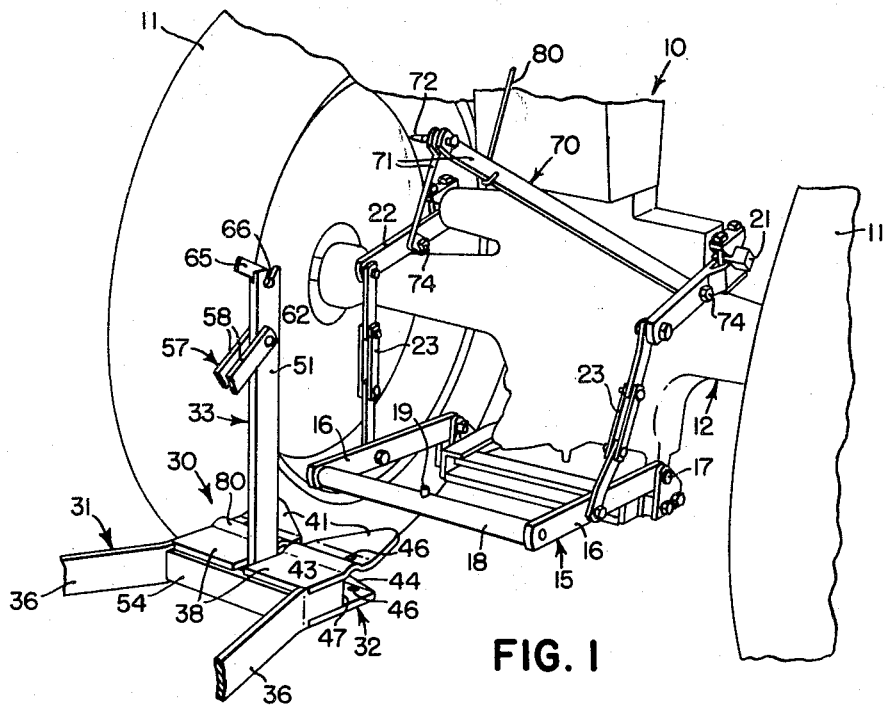
Figure 1 is a perspective view of an implement and tractor combination, in which the principles of the present invention have been incorporated.

The present invention is shown in Figure 1 as adapted to be attached to a tractor 10 of the type which includes a pair of rear tractor wheels 11 carried on axle shafts mounted for rotation in the rear axle 12 of the tractor. The latter includes a laterally rigid, generally vertically swingable drawbar or bail member 15, which consists of two side bars 16 that are pivotally connected at their forward ends to the tractor, as at 17, and rigidly connected, as by welding, to a rear crossbar 18, the central portion of which carries an upstanding attaching pin 19. The tractor 10 also includes a power lift structure, of conventional construction so far as the present invention is concerned, which includes a transverse rockshaft 21 and a pair of generally vertically swingable lift arms 22, the rear ends of which are connected to the laterally rigid drawbar bail 15 by flexible links 23 or the like.

Figure 2:
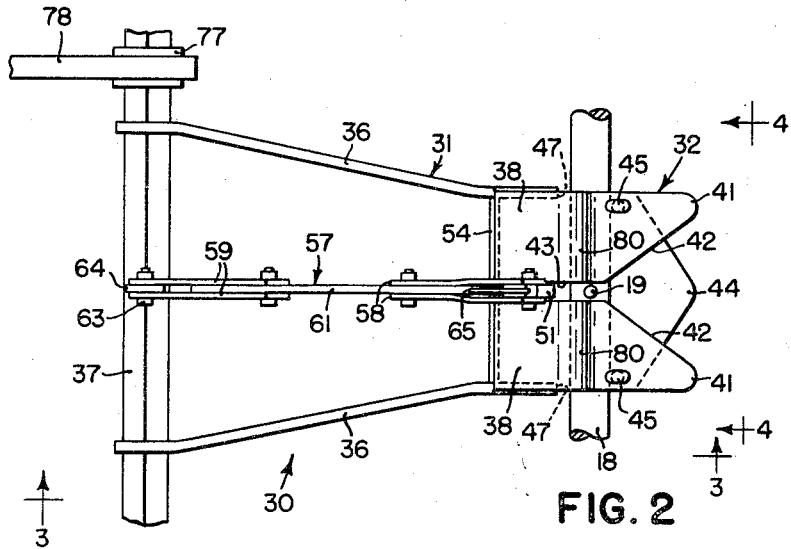
Figure 2 is a fragmentary plan view of a hitch device incorporating the present invention.

The hitch device of the present invention is indicated in its entirety by the reference numeral 30 and comprises, in general, frame means 31, a generally forwardly facing socket member 32 and a generally vertically extending, laterally swingable mast structure 33. The frame means 31 of the hitch device is made up of a pair of generally fore-and-aft extending bars 36, the rear ends of which are fixedly secured, as by welding, to a transverse tool-receiving bar 37, which preferably is square or polygonal in cross section. The socket member 32 is made up of upper and lower plates 38 and 39, the rear portions of which are secured, as by welding, to the forward end portions of the frame bars 36. The upper plate 38 has upwardly bent guiding sections 41 which have rearwardly converging edges 42 terminating in a slot 43. The lower plate is provided with a central forwardly extending, generally downwardly bent guide portion 44. As best shown in Figures 3 and 4, the vertical spacing between the upper and lower socket plates 38 and 39 is appreciably greater than the diameter of the crossbar 18 of the tractor bail 15. The upper and lower plates 38 and 39 are provided with vertically aligned apertures, spaced apart laterally, as shown in Figure 2, which receive a pair of laterally spaced apart hitch pins 45. The pin-receiving openings, which are indicated by the reference numeral 46, are spaced such a distance forwardly of the front edges 47 of the frame bars 36 that the hitch device may shift in a generally horizontal plane and generally about one or the other of the pins 45 as an axis, relative to the drawbar structure 15, the spacing just referred to being appreciably greater than the horizontal diameter of the crossbar 18.

The mast structure 33 includes a vertically extending mast bar 51, the lower end of which extends downwardly through the rear portion of the slot 43 and is loosely carried on a pin 52 fixed, as by riveting or the like, to a pair of laterally spaced apart brackets 53 seccured, as by welding, to the upper and lower plates 38 and 39, and also to a forward crossbar 54 which is secured at its ends to and interconnects the front portions of the frame bars 36. The brackets 53 are spaced apart a distance greater than the thickness of the mast bar 51, and the opening in the lower end of the bar 51 receiving the pin 52 is larger than the pin, whereby the mast bar 51 is capable of generally lateral swinging relative to the hitch frame 31. A brace 57 connects the upper end of the mast bar 51 with the rear portion of the frame 31. The brace member 57 comprises an upper pair of strap members 58 and a lower pair of strap members 59 fixedly connected to a center brace bar 61. The upper ends of the upper brace straps 58 are connected, as by a bolt 62, to the upper portion of the mast bar 51, and the lower pair of straps 59 are apertured to receive a bolt or pin 63 that is loosely disposed in an opening in a vertical bracket 64 fixed, as by welding, to the tool bar 37, generally midway between the rear ends of the frame bars 36. By this means, the lower end of the brace member 57 is loosely connected with the frame 31, similar to the lower end of the vertical mast bar 51, and therefore both of these parts can swing laterally, within limits relative to the hitch frame 31. The upper end of the mast bar 51 receives a pivoted latch 65, the forward end of which is disposed to extend into the throat or entrance of a pin-receiving socket or notch 66 formed in the upper end of the mast bar 51.

The notch 66 at the upper end of the mast bar 51 is adapted to receive the rear end of an upper compression or thrust link 70. The latter member comprises a generally V-shaped member and is made up of a pair of bars 71, the rear ends of which are disposed closely adjacent one another but held in laterally spaced apart relation by a pin 72. The forward portions of the bars 71 extend forwardly in diverging relation and are pivoted, respectively, to the lift arms 22, as by bolts or pins 74, preferably at points rearwardly of the rockshaft 21, to which the arms 22 are connected. The rear pin 72 of the thrust link member 70 is adapted to seat in the bottom of the socket 66 and be releasably held in position therein by the latch 65.

As best shown in Figures 3 and 5, the upper plate portions 38 of the socket member 32 are formed with upwardly curved sections 80 that, in effect, provide pockets on the underside of the plate 38 to receive the rear crossbar 18 when the implement is raised into a transport position, in which position the edges 47 lie against the crossbar 18 while the latter lies in the pockets 80. Since the latter sustain substantially the entire weight of the implement in its raised position, the implement is held against lateral swinging relative to the tractor. However, limited lateral swinging is permitted if, for example, one end of the implement should strike an obstruction at one side or the other of the tractor during transport.

The tool bar 37 is adapted to receive any one or more of a number of variety of tools and/or implements, and for the purposes of illustrating the principles of the present invention, I have shown a spring tooth cultivator shank 77 as representative of said tools and/or implements, it being understood that, in the case of a field cultivator or the like, there will be a plurality of such tools as indicated at 78.

In operation, when it is desired to attach the hitch device of the present invention, together with the associated tools and/or implements, to a propelling tractor, the latter is backed into position just forward of the hitch structure, the pins 45 being removed from the socket member 32 at this time. The tractor power lift mechanism is then actuated to raise or lower the crossbar 18, as necessary, until the latter is disposed directly in front of the diverging portions 41 and 44 of the socket member 32. With the upper compression link member 70 then held in an upper position, as by any suitable means, as indicated at 80, the tractor is then backed to seat the crossbar 18 in position between the upper and lower plates 38 and 39. The pins 45 are then dropped into place in the aligned openings in the plates 38 and 39, and then the upper link member 70 is swung downwardly until the pin 72 is in a position to enter the notch 66. Generally, at this time the pin 72 will be supported on the rear portion of the latch 65, but by raising the tractor drawbar bail 15 a slight amount, the implement will be rocked rearwardly a distance sufficient to permit the pin 72 to drop into the bottom of the notch 66, at which time the latch 65 automatically retains the pin in position, and thus the implement is attached to the tractor and may be raised or lowered into and out of a transport position by suitable operation of the tractor power lift mechanism.

When in ground-working position, a forward pull will be transmitted through the tractor drawbar bail 15 to the hitch device through the laterally spaced apart pins 45.

The hitch device and attached tools or implements may swing laterally relative to the tractor about a generally vertical axis, such as either one or the other of the pins 45, by virtue of the space between the crossbar 18 and the front edges 47 of the hitch frame bars 36. During such lateral swinging of the implement relative to the tractor, the upper end or socket portion 66 of the mast bar 51 shifts generally about a vertical axis relative to the pin 72, by virtue of the looseness of the pin in the socket. Since the upper or compression link member 70 is laterally rigid, relative to the tractor, being attached thereto at a pair of widely spaced apart points, when the hitch device and associated tools or implements pass over uneven ground and tend to swing about a generally fore-and-aft extending axis relative to the tractor, such action is permitted by virtue of the loose or laterally swingable connection between the lower ends of the mast bar 51 and brace member 57 and the associated hitch frame 31. Thus, even though the implement and hitch device are tilted laterally relative to the tractor, the forwardly directed thrust, normally applied to the tractor through the mast structure 33 and the compression link member 70, is always applied to the tractor generally in the vertical plane containing the fore-and-aft extending center line of the tractor. In some cases where implements having a rigid mast structure are permitted to tilt laterally relative to the tractor and are connected at the upper end of the mast structure with the tractor through a single link, the latter must necessarily pivot laterally, and in so pivoting the upper link assumes an angular position, which results in objectionable laterally directed force components that tend to prevent the implement from returning to the proper position relative to the tractor.

While I have shown and described above the preferred structure in which the principles of the present invention have been incorporated, it is to be understood that my invention is not to be limited to the particular details, shown and described, above, but that, in fact, widely different means may be employed in the practice of the broader aspects of my invention.

What I claim, therefore, and desire to secure by Letters Patent is:

1. A hitch device for connecting a ground-following implement to a tractor having a generally vertically swingable, laterally rigid drawbar bail, said device comprising a socket member attachable to said implement and including portions spaced apart to receive said bail with sufficient looseness to accommodate swinging of said implement and socket member relative to the tractor drawbar bail about a generally fore-and-aft extending axis, a generally vertically extending mast connected at its lower end with said socket member for lateral swinging relative to the latter, means connected between said mast and the implement and swingable laterally relative to the latter for holding the upper end of said mast against fore-and-aft movement relative to the implement, and a generally vertically swingable, laterally rigid thrust link member pivotally connected at its rear end with the upper end of said mast and adapted to be pivotally connected at its forward end with the tractor and held against lateral swinging relative to the tractor.

2. A hitch device for connecting a ground-following implement to a tractor having a generally vertically swingable, laterally rigid drawbar bail, said device comprising frame means, a socket member comprising a pair of vertically spaced apart plates fixed to the forward portion of said frame means and adapted to loosely receive the rear portion of said drawbar bail therebetween, hitch pin means carried by said spaced apart plates forward of said rear drawbar portion, said socket member and said frame means being adapted, by virtue of said vertical and forward spacing, to swing about a generally vertical axis and about a generally fore-an-aft extending axis, relative to said tractor drawbar bail, a generally vertical mast, means movably connecting the lower end of said mast with said frame means for lateral movement relative thereto, a brace member connected at its upper end with the upper portion of said mast, means movably connecting the lower end of said brace member with said frame means, whereby said brace member may shift laterally with said mast relative to said frame means, and laterally rigid means for connecting the upper end of said mast with the tractor.

3. A hitch device for connecting a ground-following implement to a tractor having a generally vertically swingable, laterally rigid drawbar bail and a generally vertically swingable upper link member pivotally connected with the tractor at a pair of laterally spaced apart points, whereby said upper link member is laterally rigid relative to the tractor, said hitch device including frame means, a socket member comprising a pair of vertically spaced apart plates fixed to the forward portion of said frame means and adapted to loosely receive the rear portion of said drawbar bail therebetween, hitch pin means carried by said spaced apart plates forward of said rear drawbar portion, said socket member and said frame means being adapted, by virtue of said vertical and forward spacing, to swing about a generally vertical axis and about a generally fore-and-aft extending axis, relative to said tractor drawbar bail, a generally vertical mast, means movably connecting the lower end of said mast with said frame means for lateral movement relative thereto, a brace member connected at its upper end with the upper portion of said mast, means movably connecting the lower end of said brace member with said frame means, whereby said brace member may shift laterally with said mast relative to said frame means, and means at the upper end of said mast for receiving the rear end of said upper link member.

4. A hitch device for connecting a ground-following implement to a tractor having a generally vertically swingable, laterally rigid drawbar bail, said device comprising frame means attachable to the implement and adapted to be connected with said tractor drawbar bail at two laterally spaced apart points, whereby said frame means swings with said tractor about a generally fore-and-aft extending axis, a generally vertically extending mast connected at its lower end with said frame means for lateral swinging relative thereto, means connected between said mast and the implement and swingable laterally relative to the latter for holding the upper end of said mast against fore-and-aft movement relative to said frame means, and a generally vertically swingable, laterally rigid thrust link member pivotally connected at its rear end with the upper end of said mast and adapted to be pivotally connected at its forward end with the tractor and held against lateral swinging relative to the tractor.

5. A hitch device for connecting a ground-following implement to a tractor having a generally vertically swingable, laterally rigid drawbar bail and means for raising and lowering said bail relative to the tractor for raising and lowering said implement into and out of a transport position, said device comprising a socket member attachable to said implement and including portions spaced apart to receive said bail with sufficient looseness to accommodate swinging of said implement and socket member relative to the tractor drawbar bail about a generally fore-and-aft extending axis, and means forming a pocket at the upper side of the socket member adapted to receive the bail when the latter is raised to elevate the implement, said pocket having sufficient vertical extent so as to engage said bail and prevent lateral swinging of the implement relative to the tractor when the weight of the implement is imposed on said bail through said socket member.

6. A hitch device for connecting a ground-following implement to a tractor having a generally vertically swingable drawbar bail and means for raising and lowering said bail relative to the tractor for raising and lowering said implement into and out of transport position, said device comprising a socket member attachable to said implement and including portions spaced apart to receive said bail, said socket member having a rear bail-receiving part including laterally spaced apart sections adapted to engage the bail when the latter is raised to elevate the implement, pin means carried by the socket member forward of said bail and serving to transmit draft forces from the tractor to the implement through said pin and bail, said pin means accommodating at least a limited amount of lateral swinging of the implement relative to the tractor, an upper connection pivoted to the implement forwardly of its center of gravity and adapted to be connected with the tractor and arranged so that when the bail is raised to elevate the implement the latter moves forwardly relative to the bail until stopped by the engagement of said laterally spaced apart sections with said bail, whereby laterally swinging of said implement relative to the bail is resisted.

7. A hitch device as set forth in claim 6, further characterized by means forming a pocket at the upper side of the socket member adapted to receive the bail when the latter is disposed against said spaced apart sections.

References Cited in the file of this patent
UNITED STATES PATENTS

| 1,307,427 | Woodward | June 24, 1919 |
| 2,159,669 | Morkoski | May 23, 1939 |
| 2,379,225 | Fraga | June 26, 1945 |
| 2,567,737 | Silver | Sept. 11, 1951 |
| 2,590,385 | Devereaux | Mar. 25, 1952 |